US006809999B1

(12) United States Patent
Kim et al.

(10) Patent No.: US 6,809,999 B1
(45) Date of Patent: Oct. 26, 2004

(54) DEVICE AND METHOD FOR REDUCING CROSSTALK AND INTERSYMBOL INTERFERENCE

(75) Inventors: Tae-kyung Kim, Suwon (KR); Chong-sam Chung, Seongnam (KR); Young-man Ahn, Suwon (KR); Hea-jung Seo, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/556,311

(22) Filed: Apr. 24, 2000

(30) Foreign Application Priority Data

Apr. 22, 1999 (KR) ......................................... 1999-14488

(51) Int. Cl.[7] .................................................. G11B 7/00
(52) U.S. Cl. ............................... 369/53.12; 369/53.35; 369/59.1; 369/124.01
(58) Field of Search .......................... 369/44.27, 44.34, 369/44.41, 47.1, 47.11, 47.15, 47.44, 47.55, 53.1, 53.11, 53.12, 53.15, 53.16, 53.2, 53.28, 53.35, 59.1, 124.01

(56) References Cited

U.S. PATENT DOCUMENTS

| 5,347,504 A | | 9/1994 | Ito et al. .................... 369/44.41 |
| 5,519,685 A | * | 5/1996 | Kato et al. ............. 369/112.19 |
| 5,740,141 A | | 4/1998 | Sano et al. ................... 369/859 |
| 5,818,806 A | * | 10/1998 | Wong et al. ............. 369/53.33 |

FOREIGN PATENT DOCUMENTS

| JP | 60-138748 | 7/1985 |
| JP | 62-243138 | 10/1987 |
| JP | 3-59821 | 3/1991 |
| JP | 3-252925 | 11/1991 |
| JP | 5-28502 | 2/1993 |
| JP | 5-36083 | 2/1993 |
| JP | 5-54411 | 3/1993 |
| JP | 5-73917 | 3/1993 |
| JP | 5217199 | 8/1993 |
| JP | 5-242512 | 9/1993 |
| JP | 7-6391 | 1/1995 |
| JP | 7-129962 | 5/1995 |
| JP | 8-102081 | 4/1996 |
| JP | 10-198964 | 7/1998 |
| JP | 10-241194 | 9/1998 |

OTHER PUBLICATIONS

Patent Abstracts of Japan, vol. 17, No. 408, p. 1582, Jul. 29, 1993 and JP 05 073917, Mar. 26, 1993.
Patent Abstracts of Japan, vol. 9, No. 308, p. 410, Dec. 4, 1985 and JP 60 138748, Jul. 23, 1985.
Patent Abstracts of Japan, vol. 11, No. 252, p. 605, Aug. 15, 1987 and JP 62 057134, Mar. 12, 1987.
Patent Abstracts of Japan, vol. 1996, No. 8, Aug. 30, 1996 and JP 08 102081, Apr. 16, 1996.
Patent Abstracts of Japan, vol. 12, No. 334, p. 756, Sep. 8, 1988 and JP 63 096744, Apr. 27, 1988.
Patent Abstracts of Japan, vol. 12, No. 114, p. 688, Apr. 12, 1988 and JP 62 243138, Oct. 23, 1987.

* cited by examiner

*Primary Examiner*—Muhammad Edun
(74) *Attorney, Agent, or Firm*—Staas & Halsey LLP

(57) ABSTRACT

A device for and method of reducing intersymbol interference (ISI) and/or crosstalk is disclosed. The ISI and crosstalk reducing device includes an optical detector which divides an optical signal reflected from an optical disk into central and peripheral parts in the tangential direction of the optical disk, and a correcting unit for controlling the gain value of a peripheral detection signal detected by the optical detector and adding the gain-controlled detection signal and a central detection signal to each other to provide an ISI corrected signal. Instead of using the existing waveform equalizer, the device uses a multiple-divided detection signal output from the optical detector to thereby obtain a jitter value of the same level as that obtained when the waveform equalizer is used. Further, in HD-DVD system requiring high density recording, it is possible to reduce crosstalk and ISI at the same time even when the high density recording causes crosstalk or interference between neighboring tracks.

35 Claims, 10 Drawing Sheets

DEVICE AND METHOD FOR REDUCING CROSSTALK AND INTERSYMBOL INTERFERENCE

CROSS-REFERENCE TO RELATED APPLICATIONS

This application claims the benefit of Korean Application No. 99-14488, filed Apr. 22, 1999, in the Korean Patent Office, the disclosure of which is incorporated herein by reference.

BACKGROUND OF THE INVENTION

1. Field of the Invention

The present invention relates to the field of signal reproduction in an optical disk, and more particularly, to a device and method for reducing crosstalk between neighboring tracks and intersymbol interference between adjacent marks by using multiple-divided detection signals from an optical detector.

2. Description of the Related Art

The recording and/or reproducing apparatus in an optical disk is a kind of low pass filter due to the optical transfer function (OTF) of an objective lens and the responsive characteristic of recording materials. If the recording density increases, the recording/reproducing apparatus approaches the upper limit value of the radio frequency band at which data is recorded, causing the respective waveforms to interfere with each other to generate an error when adjacent marks are reproduced. This phenomenon is called intersymbol interference (ISI). In addition, as the recording density increases, the track pitch reduces which worsens the degradation of a reproducing signal due to mutual interference between neighboring tracks. The degree of signal degradation by neighboring tracks is defined as crosstalk.

In the conventional art, a waveform equalizer is used for reducing ISI. The simplest cosine equalizer using two delay circuits is shown in FIG. 1. Referring to FIG. 1, a single pulse input from an equalizer and the coefficient of attenuators 12 and 20 are denoted by x(t) and c, respectively, the delay time of delay circuits 16 and 18 is denoted by $\tau$, and the output of the equalizer is denoted by g(t). A reproducing signal for a mark recorded on an optical disk shows the characteristic of a low pass filter. The requirement for eliminating ISI is that the output at the reproducing position of another pulse should be "zero". In other words, the requirement for ISI to equal 0 in a reproducing waveform g(t) is given below in equation (1):

$$g(nT) = 1 (n = 0) \quad (1)$$
$$= 0 (n \neq 0)$$

Where n is an integer.

Expressed in the frequency domain, equation (1) becomes equation (2) as follows:

$$\sum_{k=\infty}^{\infty} G\left(j\omega + j2\frac{\pi}{T}k\right) = G_0 \quad (2)$$

where $|\omega| < \pi/T$, k=0, ±1, ±2, . . . , $G_0$ is a constant, and the function G(jω) is the Fourier transform of g(t). From equation (2), it becomes evident that ISI=0 if what divides and overlaps G(jω) by the angular frequency width of 2π/T shows the characteristic of an ideal low pass filter.

In FIG. 1, if the attenuation coefficient c of the attenuators 12 and 20 and the delay time $\tau$ of the delay circuits 16 and 18 are appropriately selected, it is possible to remove ISI by sharpening the waveform of an input signal. The equalizer output g(t) provided from an adder 24 is represented as follows in equation (3):

$$g(t)=x(t-\tau)-c\{x(t)+x(t-2\tau)\} \quad (3)$$

Graphically, equation (3) and the signals within the circuits in FIG. 1 are shown in FIG. 2A. FIG. 2A shows the reproducing positions of the output signal −cx(t) of an inverter 14, the output signal of x(t−τ) of the delay circuit 16, and the output signal −cx(t−2τ) of an inverter 22. FIG. 2B shows the resulting waveform from the adder 24, g(t), from which the ISI has been removed,.

However, a problem with the conventional waveform equalizer used to reduce ISI as shown in FIG. 1 is that adjacent mark signals have a predetermined time delay, so that the reproducing signal of a currently recorded mark cannot be detected in real time.

SUMMARY OF THE INVENTION

As such, it is an object of the present invention to provide a device for reducing intersymbol interference (ISI) by using multiple-divided detection signals from an optical detector instead of a waveform equalizer.

It is another object to provide a device for reducing crosstalk and ISI using multiple-divided detection signals from an optical detector instead of a waveform equalizer.

It is still another object to provide a method of dividing detection signals from an optical detector to optically minimize ISI into multiple-divided signals and operating the same.

It is still further another object to provide a method of dividing detection signals from an optical detector to optically minimize crosstalk and ISI into multiple-divided signals and operating the same.

Accordingly, to achieve the above objects of the present invention, there is provided a device for reducing an ISI in the recording/reproducing apparatus of an optical disk, the device including a detector for detecting an optical signal reflected from an optical disk by dividing the optical signal into central and peripheral parts in the tangential direction of the optical disk to provide central tangential and peripheral tangential detection signals, and a correcting unit for both controlling the gain value of the peripheral tangential detection signal to produce a gain-controlled peripheral tangential detection signal, and operating the gain-controlled peripheral tangential detection signal and the cental detection signal to provide a signal in which the ISI is corrected.

Further, the present invention provides a device for reducing ISI and crosstalk in the recording/reproducing apparatus of an optical disk, including a detector for detecting an optical signal reflected from the optical disk by dividing the optical signal into the central and peripheral parts in the radial direction of the optical disk, to provide central radial and peripheral radial detection signals, and the central and peripheral parts in the radial direction that also lie in the peripheral parts in the tangential direction to provide central radial peripheral tangential and peripheral radial peripheral tangential detection signals, and a correcting unit for generating a first signal by controlling the peripheral radial detection signal using a first gain value to produce a first gain-controlled peripheral radial detector signal, and operating the first gain-controlled peripheral radial detection signal and the central radial detection signal to create the first signal, generating a gain controlled second signal by gain-controlling the peripheral radial peripheral tangential detection signal using the first gain value to provide a second gain-controlled peripheral radial peripheral tangential detection signal, operating the second gain-controlled peripheral radial peripheral tangential detection signal and the central radial peripheral tangential detection signal to provide a second signal, gain-controlling the second signal using a second gain value to provide a gain-controlled second signal, and operating the first and the gain-controlled second signals to provide a signal in which crosstalk and ISI are corrected.

There is provided a method for reducing ISI in the recording/reproducing apparatus of an optical disk includes the steps of dividing an optical signal reflected from the optical disk into central and peripheral parts in the tangential direction of an optical disk to provide central tangential and peripheral tangential detection signals, controlling the gain value of the peripheral tangential detection signals to provide a gain controlled peripheral tangential detection signal, and operating the gain-controlled peripheral tangential detection signals and the central tangential detection signal to provide a signal in which ISI is corrected. In this case, the gain value is adjusted to minimize ISI by adjacent marks.

Further, the present invention provides a method for reducing ISI in the recording/reproducing apparatus of an optical disk including the steps of dividing an optical signal reflected from the optical disk into central and peripheral parts in the radial direction of the optical disk to provide central radial and peripheral radial detection signals, and central and peripheral parts of the radial direction that also lie in the the peripheral parts of the tangential direction to provide central radial peripheral tangential and peripheral radial peripheral tangential detection signals, generating a first signal by controlling the peripheral radial detection signal using a first gain value to provide a gain controlled peripheral radial detection signal and operating the gain-controlled peripheral radial detection signal and the central radial detection signal to provide the first signal, generating a gain controlled second signal by controlling the peripheral radial peripheral tangential detection signal using the first gain value to provide a gain-controlled peripheral radial peripheral tangential detection signal, operating the gain-controlled peripheral radial peripheral tangential detection signal and the central radial peripheral tangential detection signal to provide a second signal, controlling the second signal using a second gain value to provide a gain controlled second signal, and operating the first signal and the gain controlled second signal to provide a signal in which crosstalk and ISI are corrected. In this case, the first gain value is adjusted to minimize crosstalk caused by neighboring tracks, and the second gain value is adjusted to minimize ISI by adjacent marks.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
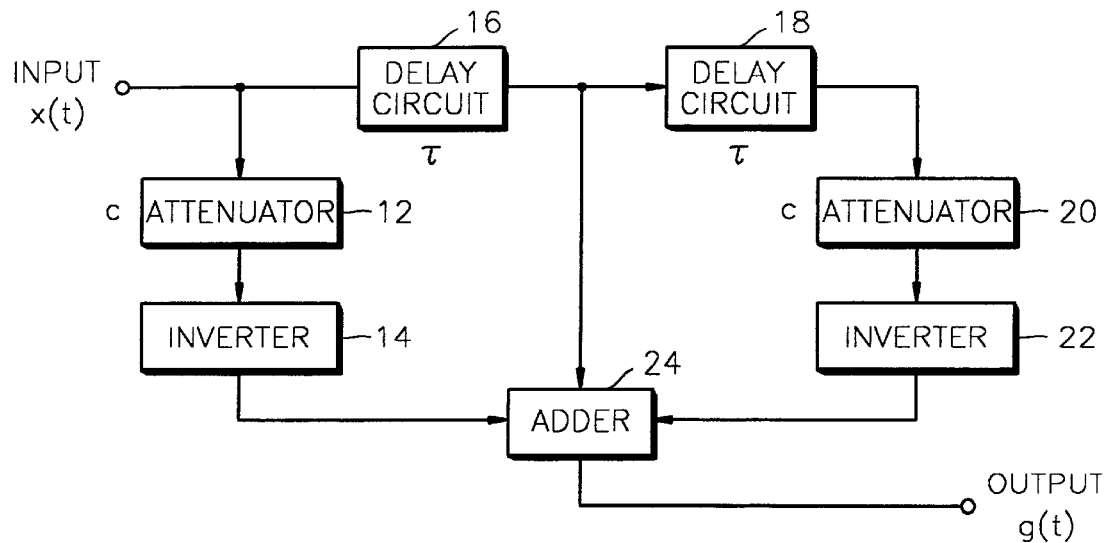
FIG. 1 is a block diagram of a conventional waveform equalizer.
Figure 2A:
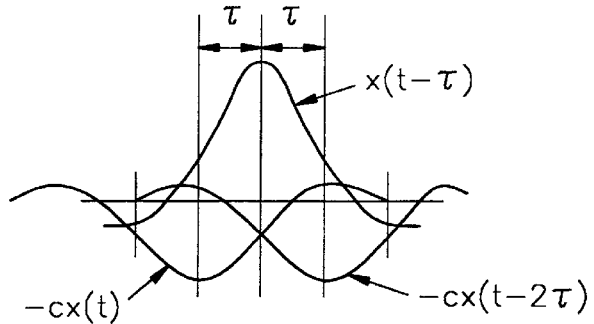
FIG. 2A shows the signals within the waveform equalizer reproducing signal by adjacent marks.
Figure 2B:
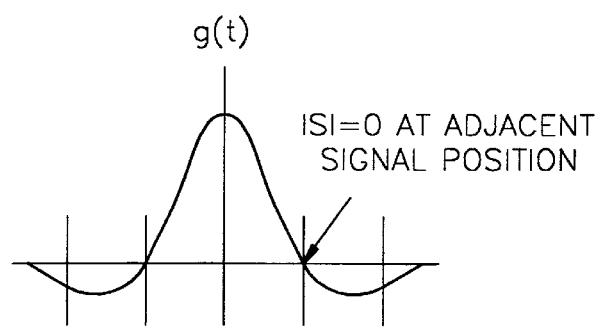
FIG. 2B shows the output signal of the waveform equalizer shown in FIG. 1.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

At the outset, in an optical disk recording/reproducing apparatus for recording information on an optical disk with a focusing spot by laser beams and an objective lens or reproducing the recorded information, recording capacity is determined by the focusing spot size D which is in turn determined by the wavelength $\lambda$ of laser beams and the numerical aperture (NA) of an objective lens as follows in equation (4):

$$D \propto \lambda/NA \qquad (4)$$

Once the focusing spot size D is determined, assuming that the shortest length of marks recorded on a disk is $P_L$, the shortest mark length can be determined using equation (5) so that interference between marks does not affect a reproducing signal.

$$P_L \geq \frac{1}{2}\frac{\lambda}{NA} \quad (5)$$

In other words, when the above requirement in equation (5) is met, ISI can be reduced.

As an example, for a compact disk (CD) using an objective lens having a laser light source of 780 nm and a NA of 0.45, and the shortest mark $P_L$ has a length of 0.83 μmu, which meets the requirement in equation (5) that $P_L \leq 0.87$ μm. However, for a digital versatile disk (DVD), the shortest mark $P_L$ has a length of 0.4 μm, which violates the requirement of $P_L = 0.87$ μm in equation (5). Further, in a high density-digital versatile disk (HD-DVD), which has been studied for achieving a capacity of greater than 15 giga bytes (GB), the shortest mark length $P_L$ falls far short of the requirement in equation (5). Thus, for these latter cases, crosstalk by neighboring tracks as well as interference between adjacent marks will increase.

As a solution for reducing such ISI and/or crosstalk, the present invention proposes that a signal output from an optical detector having a multiple-division structure is appropriately operated to minimize ISI optically instead of using the conventional waveform equalizer. This means that the fundamental structure of an optical pickup in the present invention is the same as that of a conventional one, while the structure of an optical detector for detecting light reflected from a disk is different from that of the conventional one. Thus, the optical detector according to the present invention minimizes ISI generated by interference between adjacent marks and/or crosstalk in real time, while not requiring the redesign of the conventional optical pickup.

Figure 3:
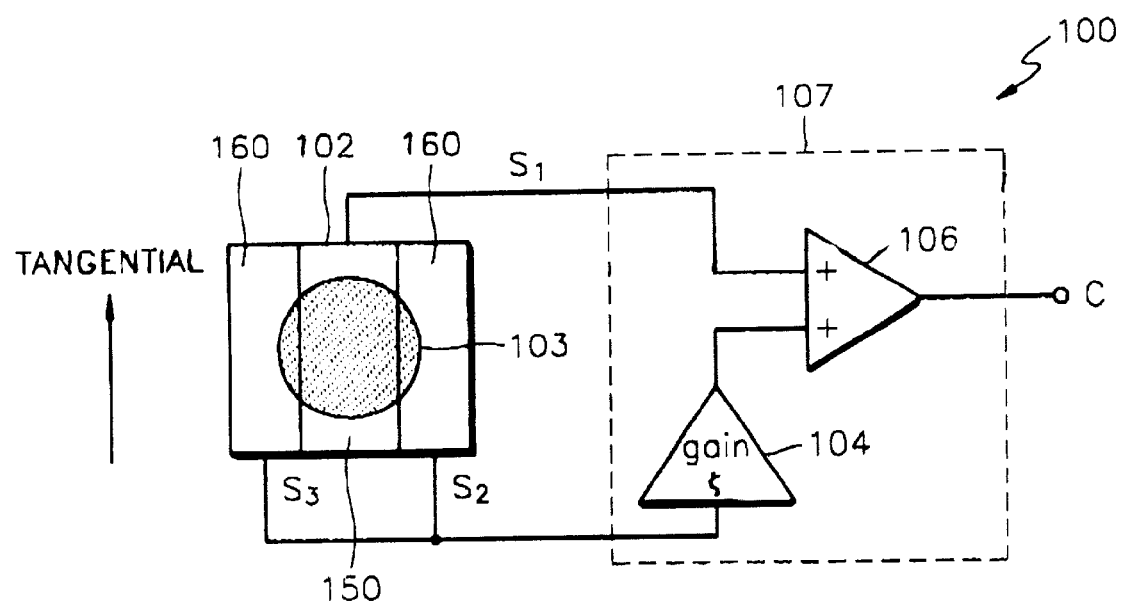
FIG. 3 is a circuit diagram of a device for reducing intersymbol interference (ISI) according to one preferred embodiment of the present invention.

FIG. 3 shows a circuit diagram for an ISI reducing device 100 according to one preferred embodiment of the present invention. The ISI reducing device 100 has an optical detector 102 that is divided into central and peripheral parts in the tangential direction of a disk as defined in the FIG. 3. Within the central part in the tangential direction, the optical detector 102 includes a first light-receiving unit 150 for receiving the central part of the incident light focused on the focusing spot 103. In addition, the optical detector 102 includes a second light-receiving unit 160 disposed on both of the first light-receiving unit 150. The second light-receiving unit 160 receives the peripheral part of the incident light focused on the focusing spot 103 independently of the first light-receiving unit 150. As shown, the first light-receiving unit 150 has a predetermined size so as to include a central part within the range of about 10–90% of the incident light. However, it is understood, but not shown, that the first light-receiving unit 150 may include a different range size, and that the second light-receiving unit 160 may be disposed on only one side of the first light receiving unit 150.

When in use, the first light receiving unit 150 detects the incident light in the central part, and generates the central tangential detection signal $s_1$, while the second light receiving unit 160 detects the incident light on the peripheral parts and generates peripheral tangential detection signals $s_2$ and $s_3$. Gain controller 104 multiplies the two peripheral tangential detection signals $s_2$ and $s_3$ by ISI correction coefficient ξ to amplify or attenuate the peripheral detection signals to create gain-controlled peripheral tangential detection signals. The adder 106 operates on the gain-controlled peripheral tangential detection signals by adding the central tangential detection signal $s_1$ and the gain-controlled peripheral tangential detection signals to obtain an ISI corrected signal, C. As shown, the gain controller 104 can serve as a multiplier. Together, the gain controller 104 and adder 106 form a correcting unit 107 for correcting ISI for the detection signals output from the optical detector 102.

Figure 4:
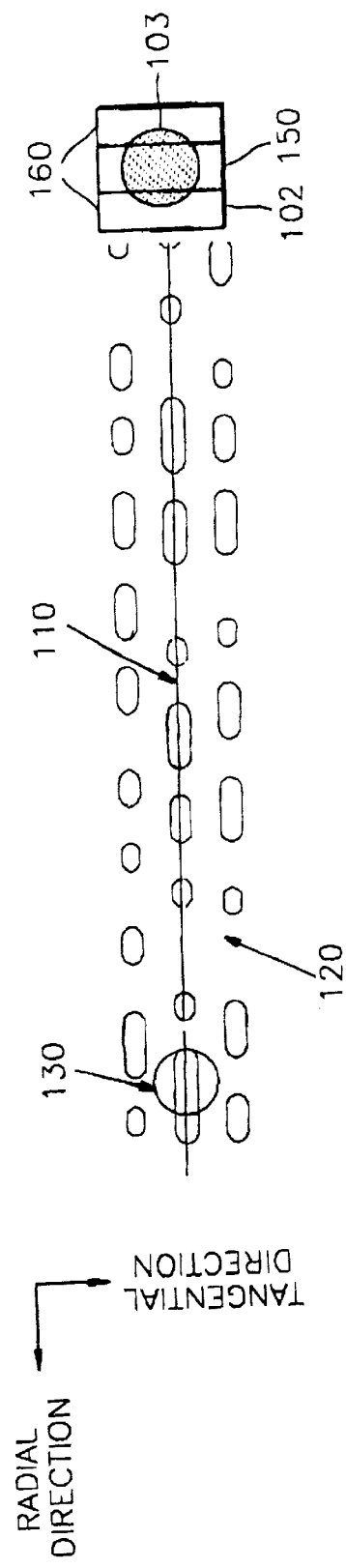
FIG. 4 is a diagram showing the tangential direction of a disk and optical detector to aid in the understanding of the present invention.
Figure 5:
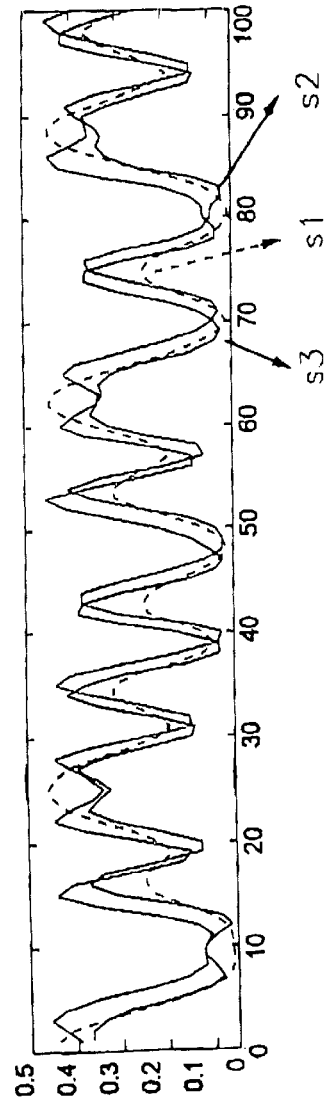
FIG. 5 is a diagram showing a reproducing signal detected from an optical detector

FIG. 4 shows the ISI reducing device 100 when used to reproduce a signal along the middle track 110 of a disk 120. As shown, given the size of the light spot 130 and the focusing spot 103, ISI by adjacent marks will occur. In order to reduce the ISI according to the present invention, the optical detector 102 is divided into three sections, a central part and two peripheral parts, in the tangential direction of a disk. As is evident from FIG. 4, as the optical detector 102 moves along the radial direction, peripheral tangential detection signal $s_2$ leads the central tangential detection signal $s_1$ in time, while the peripheral tangential detection signal $s_3$ lags the central tangential detection signal $s_1$. Expressed mathematically, the correction signal output from the adder 106, C, is computed as follows in equation (6):

$$C = s1 + \xi \cdot (s2 + s3) \quad (6)$$

Figure 6:
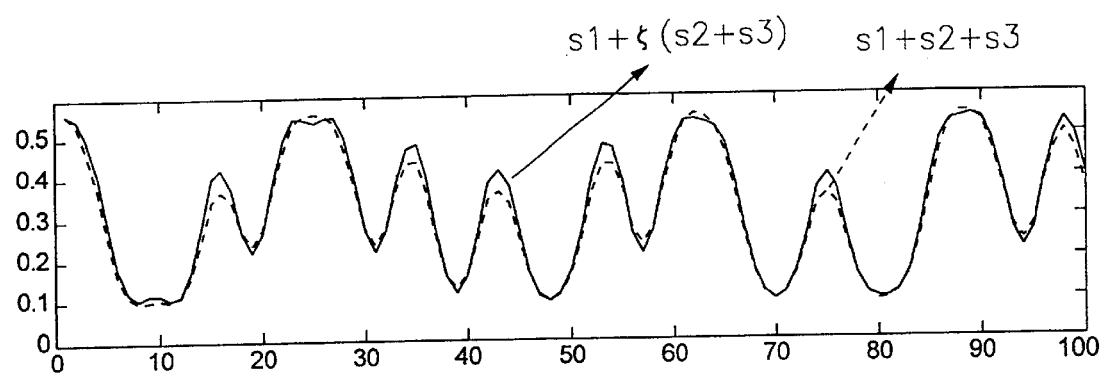
FIG. 6 is a diagram showing a signal $s_1+\xi(s_2+s_3)$, in which ISI is corrected; and the detection signal $s_1+s_2+s_3$ of an optical detector.

The importance of the gain in the correction unit 107 is evident in FIG. 6, which compares $C|_{gain}$ for ξ≠1, against $C|_{no\ gain}$ where there is no gain (i.e. ξ is 1). FIG. 6 shows that the modulation efficiency of the ISI removed correction signal, $C|_{gain}$, is improved as compared to that of the detection signal $C|_{no\ gain}$ output from the optical detector without gain-control of the detection signals $s_2$ and $s_3$.

Figure 7:
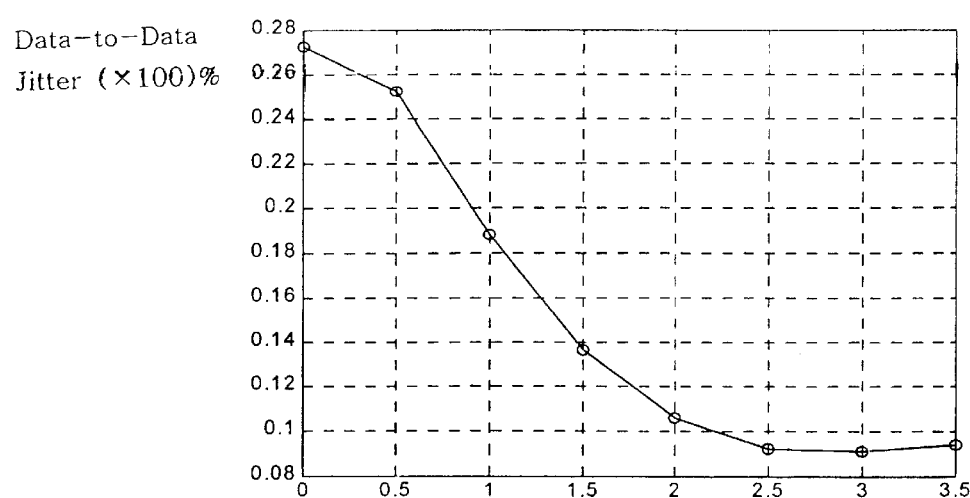
FIG. 7 is a diagram showing jitter value according to ISI correction gain coefficient $\xi=3$.

In addition, FIG. 7 shows the jitter value for $C|_{gain}$ using an ISI correction gain coefficient ξ=3 where the width of a central light-receiving unit 150 is two thirds the diameter of the focusing spot 103. As seen in FIG. 7, the jitter value is 9.09%, and produces the the eye pattern shown in FIG. 10.

Figure 8:
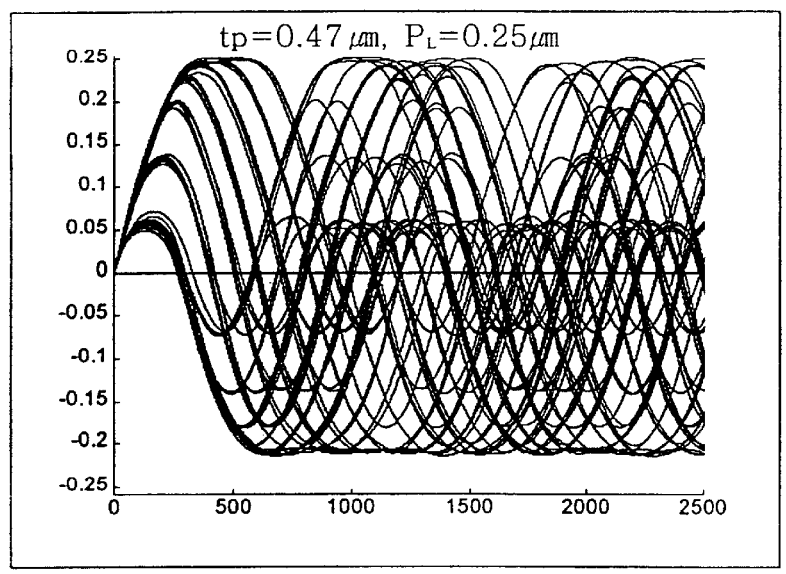
FIG. 8 is a diagram showing the eye pattern of a signal $s_1+s_2+s_3$ not subjected to equalization to aid in the understanding of the present invention.
Figure 9:
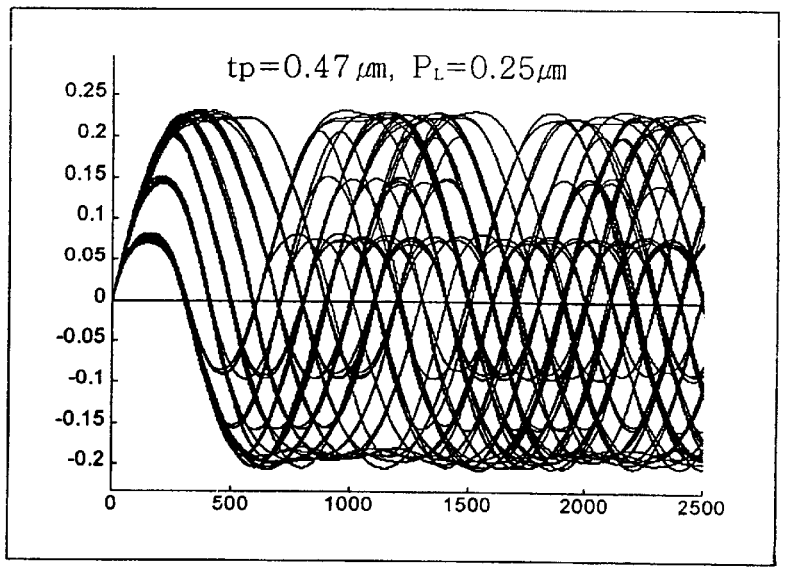
FIG. 9 is a diagram showing the eye pattern of a signal $s_1+s_2+s_3$ subjected to conventional waveform equalization to aid in the understanding of the present invention.
Figure 10:
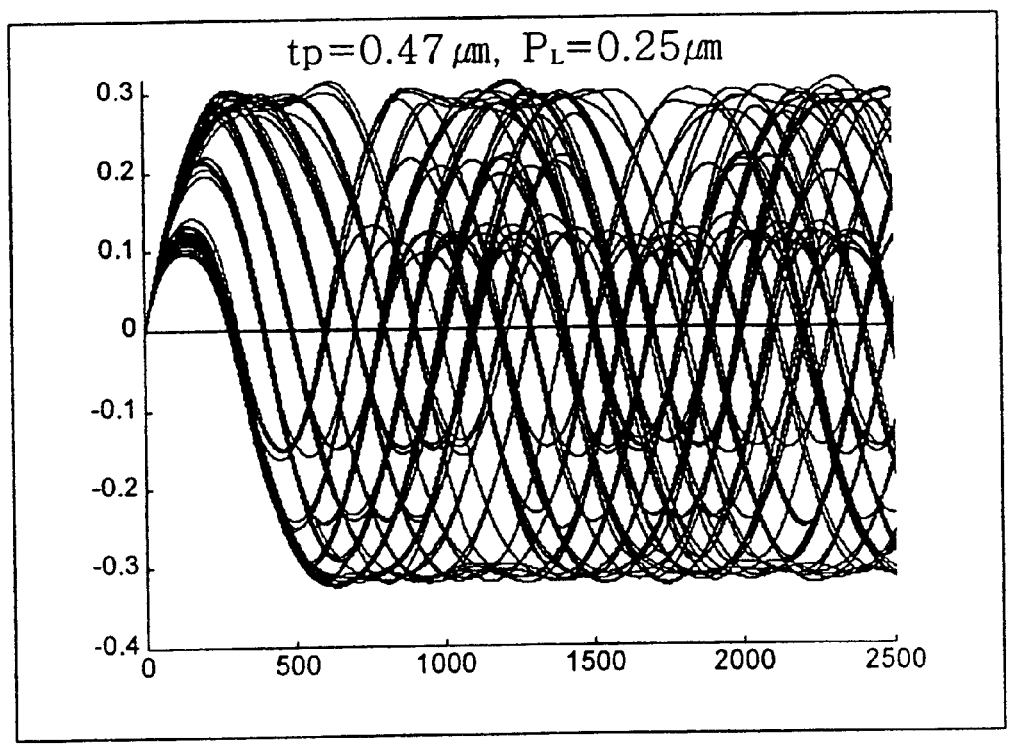
FIG. 10 is a diagram showing the eye pattern of the output signal $s_1+3(s_2+s_3)$ when $\xi=3$ according to the present invention.

By way of comparison, FIGS. 8–10 show various correction signals for a disk 120 having a track pitch $t_p$ of 0.47 μm, a shortest mark length $P_L$ of 0.25 μm is reproduced with a light source having a wavelength 410 nm and an objective lens having a NA of 0.6. FIG. 8 shows the eye pattern of the detection signal $C|_{no\ gain}$, which is output from an optical detector 102, without being subjected to equalization either by a conventional equalizer or by gain controlling the detection signals $s_2$ and $S_3$ according to the present invention. FIG. 9 shows the eye pattern of the signal subjected to equalization by a conventional waveform equalizer. FIG. 10 shows the eye pattern of an ISI correction signal $C|_{gain}$ using an ISI correction gain coefficient ξ=3 output from the adder 106 shown in FIG. 3, and without using a conventional equalizer For the signal shown in FIG. 8, the data to data jitter value before equalization of the signal $C|_{nogain}$ is about 18.78%, which is a large ISI value. In FIG. 9, where the jitter value of a signal $C|_{nogain}$ is equalized by a conventional waveform , the jitter value is reduced to 8.47%. In contrast, FIG. 10 shows that the jitter value of a correction signal $C|_{nogain}$ in which ISI is corrected with a optical detector 102 according to the present invention, the jitter value is reduced to 9.09%. From FIGS. 8–10, it is found that the jitter value when using the existing equalizer is almost the same as that when no equalizer is used and gain control is implemented according to the present invention.

Figure 11:
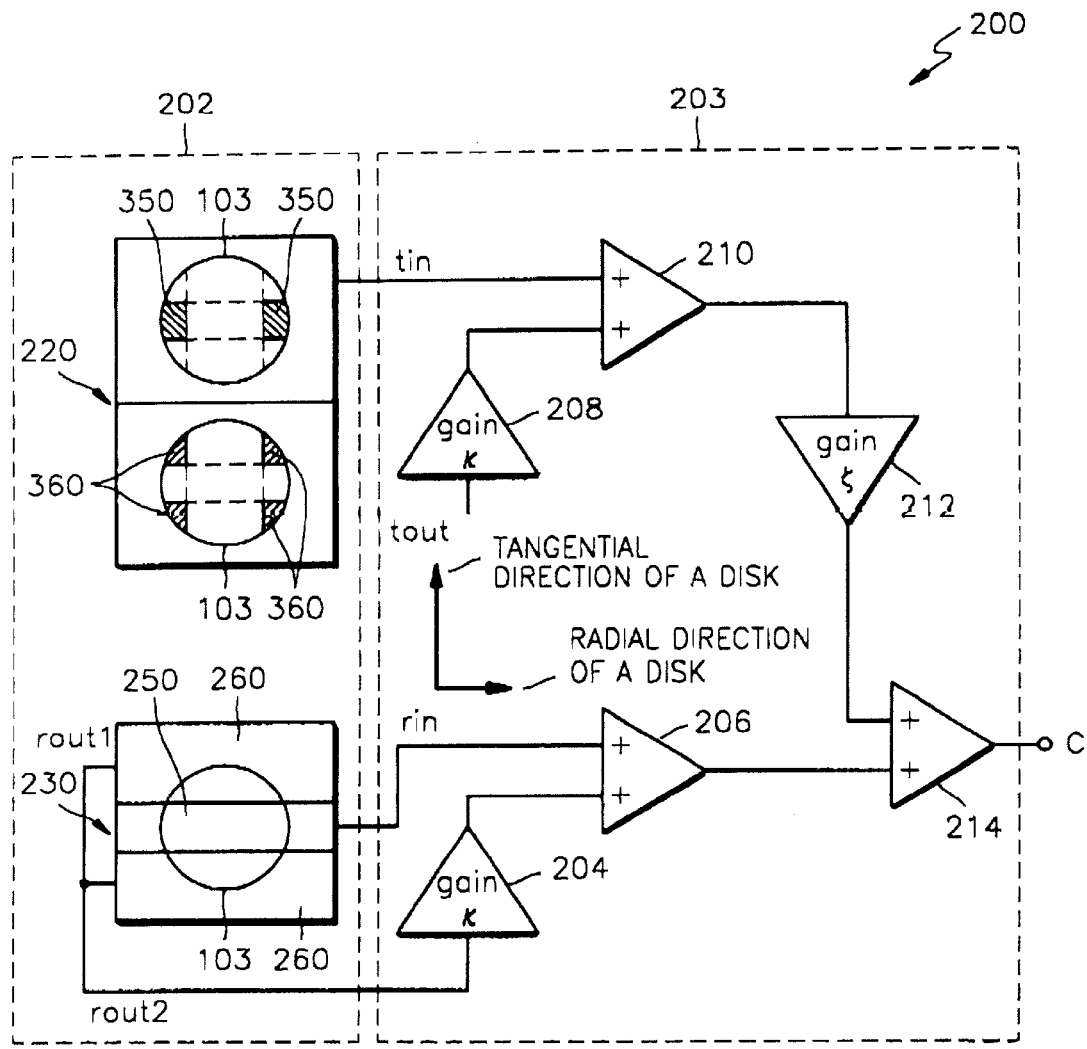
FIG. 11 is a circuit diagram for ISI and crosstalk reducing device according to another preferred embodiment of the present invention.

In a further embodiment shown in FIG. 11, both ISI and cross talk are reduced using the ISI and Cross Talk Reducing Device 200. As shown in FIG. 11, the ISI and Cross Talk Reducing Device 200 includes an optical detector 202, which includes an upper optical detector 220 and a lower optical detector 230. Optical detectors 220 and 230 provide a structure for correcting crosstalk, which arises when the recording density is higher than a DVD, as well as ISI, which arises as the recording density increases. In the embodiment shown in FIG. 11, the lower optical detector 230 includes a first light-receiving unit 250, which produces a central radial detection signal, $r_{in}$, produced from the the incident light of the central part in the radial direction falling in the focusing spot 103. The lower optical detector 230 also includes a second light-receiving unit 260 producing peripheral radial detection signals $r_{out1}$ and $r_{out2}$, produced from the incident light falling on the peripheral parts in the radial direction. In addition, upper optical detector 220 includes a third light-receiving unit 350 which produces a central radial peripheral tangential detection signal $t_{in}$, from incident light falling in the focusing spot 103 in the region defined by the central part in the radial direction and the the peripheral parts in the tangential direction. The upper optical detector 220 also includes a fourth light-receiving unit 360 which produces peripheral radial peripheral tangential detection signal $t_{out}$ from incident light falling in the focusing spot 103 in the region defined by the peripheral part in the radial direction and the the peripheral parts in the tangential direction.

Figure 12:
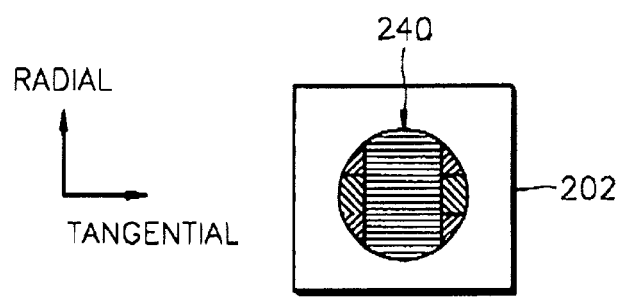
FIG. 12 is a diagram showing the configuration of the hologram used in a light receiving unit when crosstalk exists.

In order to separate the incident light onto optical detectors 220 and 230, a preferred embodiment uses a hologram 240 shown FIG. 12. The hologram 240 is preferably located between the optical lens (not shown) and the optical detector 202 so as to diffract some of the incident light onto the third light receiving unit 350 and the fourth light receiving unit 360 of the upper optical detector 220, while allowing the remaining incident light to pass straight through onto the first light-receiving unit 250 and second light-receiving unit 260 of the lower optical detector 230. However, it is recognized that, instead of using the hologram 240, one could use a single optical detector 202 that is divided into the optical detectors 250, 260, 350, and 360.

However the light is separated, the lower optical detector 230 shown in FIG. 11 detects the incident light falling on the focusing spot 103 in the central and peripheral parts in the radial direction. The width of the central part in the radial direction is set to be one third the diameter of the focusing spot 103, which is focused to the zero order through the hologram shown in FIG. 12.

As shown in FIG. 11, the upper optical detector 220 is configured such that the width of the central part in the tangential direction is two thirds of light spot 130, while the width the central part in the radial direction is one third of the light spot 130. The upper optical detector 220 detects the incident light falling on the focusing spot 103 in the region defined by the peripheral parts in the tangential direction. Within the tangential peripheral parts, the upper optical detector 220 detects the incident light which is diffracted to the first order by the hologram shown in FIG. 12.

From the incident light, the optical detector 202 produces detection signals $r_{rout1}$, $r_{out2}$, $t_{out}$, and $t_{in}$, which are received by the correcting unit 203. Within the corrected unit 203, a first gain controller 204 controls gain by multiplying the sum of central radial detection signals, $r_{rout1}+r_{out2}$, produced by the second light receiving unit 160 by crosstalk correction gain coefficient K, with result being operated upon by a first adder 206. The first adder 206 adds the central radial detection signal $r_{in}$ and the gain-controlled peripheral detection signals from the first gain controller 204 to provide a first signal, $r_{in}+\kappa(r_{out1}+r_{out2})$, which is operated upon by a third adder 214.

In addition, second gain controller 208 multiplies the peripheral radial peripheral tangential detection signal $t_{out}$ by the crosstalk correction gain coefficient κ to produce a gain-controlled peripheral radial peripheral tangential detection signal, $\kappa(t_{out})$, which is the result being operated upon by a second adder 210. The second adder 210 adds the central radial peripheral tangential detection signal $t_{in}$ and the gain-controlled peripheral radial peripheral tangential detection signal $\kappa(t_{out})$ to produce a second signal.

A third gain controller 212 multiplies the second signal by ISI correction gain coefficient ξ. The resulting gain-controlled second signal, $\xi(t_{in}+\kappa\cdot(t_{out})$ is operated upon by the third adder 214, which adds the gain-controlled second signal to the first signal from the first adder 206 to produce a signal, C, a signal from which crosstalk and ISI are removed. C can be expressed as equation (7) as follows:

$$C=\{rin+\kappa\cdot(rout1+rout2)\}+\xi\cdot\{tin+\kappa\cdot tout\} \qquad (7)$$

where κ and ξ are each gain coefficients for removing crosstalk and ISI.

Figure 13A:
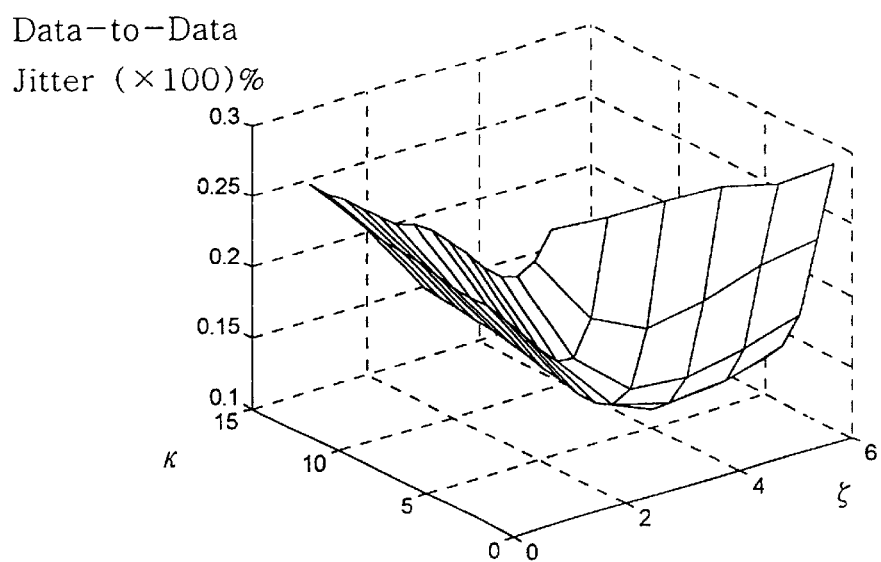
FIGS. 13A and 13B each are diagrams showing jitter values according to ISI correction gain coefficient $\xi$ and crosstalk correction gain coefficient K when crosstalk exists.
Figure 13B:
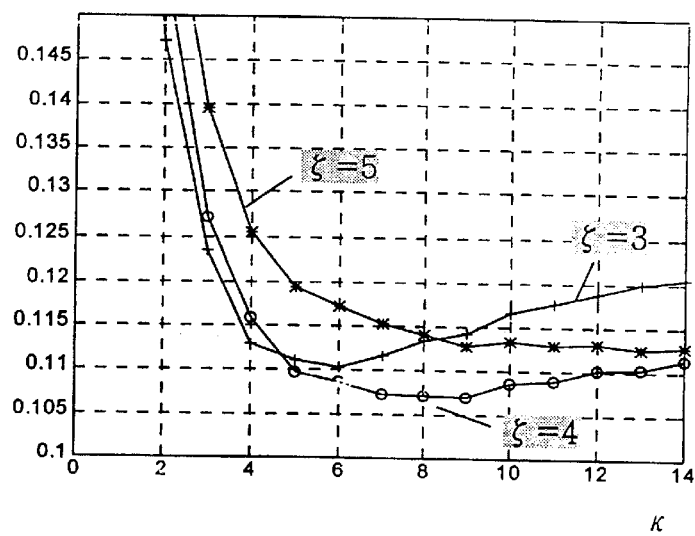

Using the ISI and cross talk reducing device 200 shown in FIG. 11, the resulting jitter values are shown in FIGS. 13A and 13B FIGS. 13A and 13B show a jitter values for multiple ISI correction gain coefficient ξ and the crosstalk correction gain coefficient κ in both three-dimensional and two-dimensional graphs. As an example, when ξ=4 and κ=9, as the jitter value is] of 10.71%. The resulting eye pattern is shown in FIG. 16.

Figure 14:
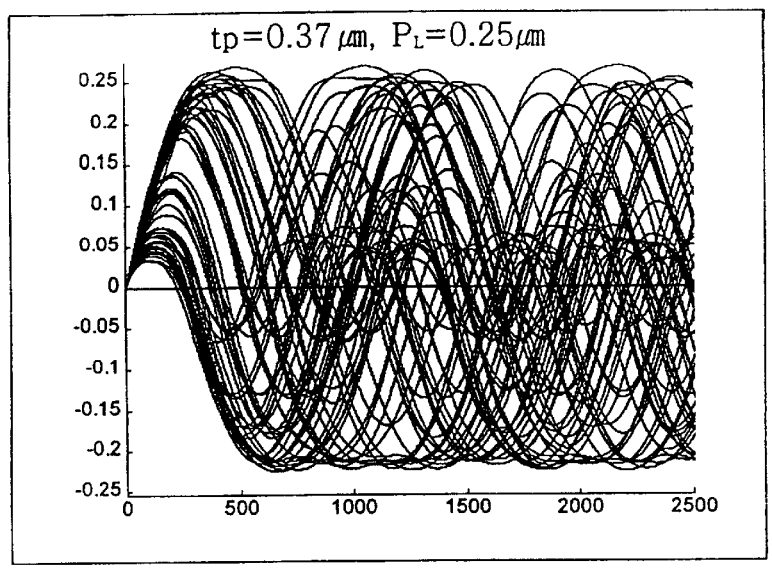
FIG. 14 is a diagram showing the eye pattern of a detection signal $r_{in}+r_{out1}+r_{out2}$ for the radial direction of an optical detector not subjected to equalization for understanding of the present invention.
Figure 15:
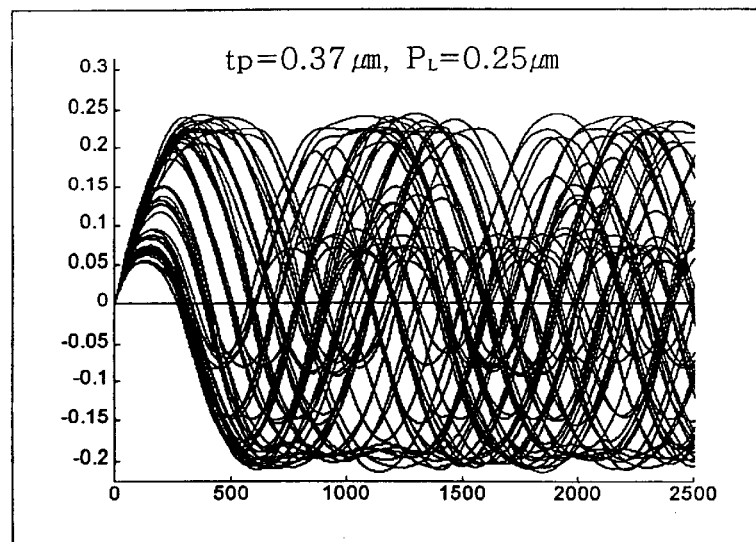
FIG. 15 is a diagram showing the eye pattern of a detection signal for the radial direction of an optical detector subjected to waveform equalization to aid in the understanding of the present invention.
Figure 16:
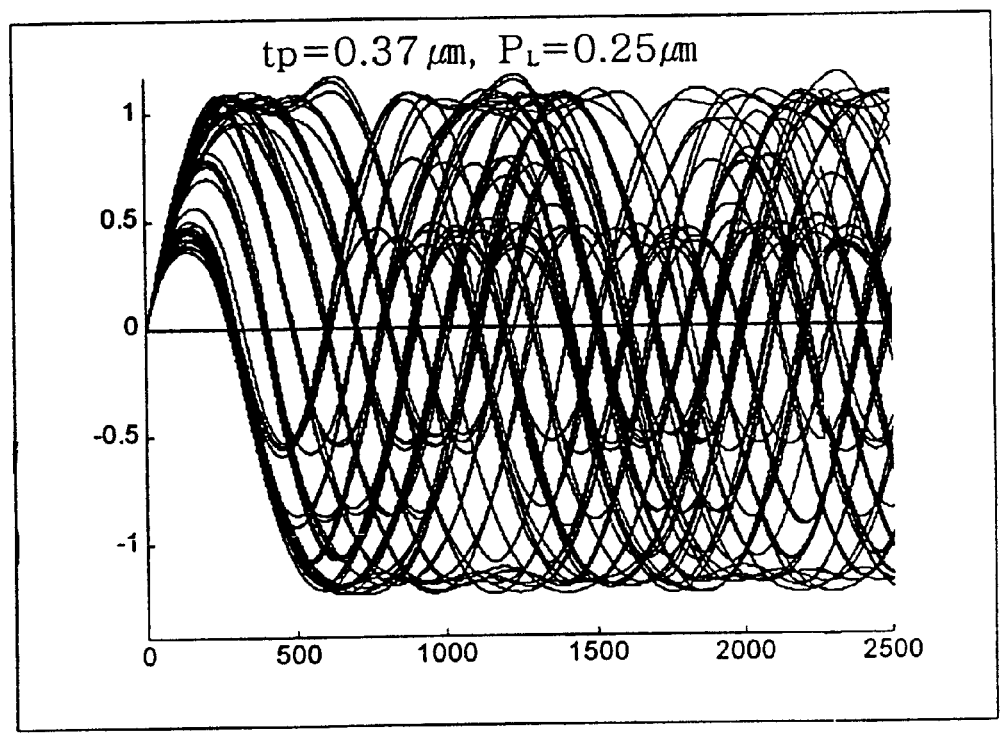
FIG. 16 is a diagram showing the eye pattern of an output signal according to the present inventions when $\xi=4$ and $\kappa=9$.

By way of comparison, FIGS. 14–16 show the eye patterns for a disk having a track pitch $t_p$ of 0.37 μm, the shortest mark length $P_L$ of 0.25 μm, a light source of 410 nm wavelength, and an objective lens having a NA of 0.6. FIG. 14 shows the simulated eye pattern of the sum signal without gain control, which means $C|_{nogain}=r_{in}+r_{out1}+r_{out2}$. In this case, the data-to data jitter value is about 27.07%, and there is a great deal of crosstalk and ISI.

As shown in FIG. 15, when the signal $r_{in}+r_{out1}+r_{out2}$ is equalized by a conventional 3-tab equalizer, the jitter value is reduced to 16.29%, which demonstrates that an effect by crosstalk still remains. However, as shown in FIG. 16, using the ISI and cross talk reducing device 200 according to the present invention, when a reproducing signal detected by a multiple-division optical detector is gain-controlled instead of using an equalizer, it can be seen that the jitter value is reduced to 10.71%, showing a greatly reduced effect of cross talk.

In addition, while not shown, to detect the central and peripheral parts of a multiple-division optical detector in the tangential and/or radial direction, respectively, shown in FIGS. 3 and 11, the present invention can employ a device to divide incident light into central and peripheral parts using an optical element such as gratings to provide each of light beams diverged by the optical element to a plurality of optical detectors for photoelectrically converting them independently.

As described in the foregoing, the present invention employs the multiple-division detection signals of an optical detector instead of using the conventional waveform equalizer, so that a jitter value of the same level as that obtained by using the waveform equalizer can be obtained. Further, in HD-DVD system requiring high density recording, it is possible to reduce crosstalk and ISI at the same time even when the high density recording causes crosstalk or interference between neighboring tracks.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A device for reducing an intersymbol interference in the recording/reproducing apparatus of an optical disk having a tangential direction, the device comprising:

a detector which divides an optical signal reflected from the optical disk into central and peripheral parts in the tangential direction of the optical disk to provide central tangential and peripheral tangential detection signals; and a correcting unit which controls a gain value of the peripheral tangential detection signal to produce a gain-controlled peripheral tangential detection signal, and which operates the gain-controlled peripheral tangential detection signal and the central tangential detection signal to provide a signal in which the intersymbol interference is corrected.

2. The device of claim 1, wherein the detector comprises:

an optical detector including a first light-receiving unit which receives the central part of the optical signal, and a second light-receiving unit disposed on at least one side of the first light-receiving unit which receives the peripheral part of the optical signal independently of the first light-receiving unit.

3. The device of claim 2, wherein the first light-receiving unit has a predetermined size so as to form the central part within the range of about 10–90% of the optical signal.

4. The device of claim 1, wherein the detector comprises:

an optical element for straight transmitting the central part of the optical signal and diffracting the peripheral part of the optical signal at a predetermined angle to divide the optical signal into central and peripheral central and peripheral optical signals with regard to the tangential direction of the optical disk, and a plurality of optical detectors for photoelectrically converting each of the central and peripheral optical signals diffracted by the optical element independently.

5. The device of claim 1, wherein the correcting unit comprises:

a gain controller which multiplies the peripheral tangential detection signal by a gain adjusted to minimize interference between adjacent marks to provide the gain-controlled peripheral tangential detection signal, and an adder which adds the gain-controlled peripheral tangential detection signal provided from the gain controller and the central tangential detection signal.

6. A device for reducing crosstalk and intersymbol interference in a recording/reproducing apparatus of an optical disk having a tangential and radial direction, the device comprising:

a detector which divides an optical signal reflected from the optical disk into central and peripheral parts in the radial direction of the optical disk to provide a central radial detection signal and a peripheral radial detection signal, and into a first region common to the peripheral parts in the radial direction and peripheral parts in the tangential direction to provide a peripheral radial peripheral tangential detection signal, into a second region common to the central parts in the radial direction and peripheral parts in the tangential direction to provide a central radial peripheral tangential detection signal; and a correcting unit which gain-controls the peripheral radial detection signal using a first gain value to provide a first gain-controlled detection signal, operates the first gain-controlled detection signal and the central radial detection signal to generate a first signal, gain-controls the peripheral radial peripheral tangential detection signal using the first gain value to provide a second gain controlled detection signal, operates the second gain controlled detection signal and the central radial peripheral tangential detection signal to provide a second signal, gain controls the values of the second signal using as a second gain value to provide a gain controlled second signal, and operates the first and the gain controlled second signals to provide a signal in which crosstalk and intersymbol interference are corrected.

7. The device of claim 6, wherein the detector comprises:

an optical detector including a first light-receiving unit which receives the central part of the optical signal, a second light-receiving unit disposed on at least one side of the first light-receiving unit which receives the peripheral part of the optical signal independently from the first light-receiving unit, a third light-receiving unit which receives the the optical signal falling in the second region, a fourth light-receiving unit which receives the optical signal falling in the first region.

8. The device of claim 7, wherein the first light-receiving unit has a predetermined size so as to form a central part within the range of about 10–90% of the optical signal.

9. The device of claim 6, wherein the detector comprises:

an optical element for directly transmitting the central part of the optical signal and diffracting the peripheral part of the optical signal at a predetermined angle to divide the optical signal into optical signals of the central and peripheral parts with regard to the radial direction of an optical disk, and optical signals associated with the the first and second regions, and a plurality of optical detectors for photoelectrically converting each of the light diffracted by the optical element independently.

10. The device of claim 9, wherein the correcting unit comprises:

a first gain controller which multiplies a first gain value adjusted to minimize crosstalk by the peripheral radial detection signal to provide the first gain-controlled detection signal;

a first adder which adds the first gain-controlled detection signal and the central radial detection signal to provide a first signal;

a second gain controller which multiplies the peripheral radial peripheral tangential detection signal by the first gain value to provide the second gain-controlled detection signal;

a second adder which adds the second gain-controlled detection signal and the central radial peripheral tangential detection signal the second signal by a second gain value adjusted to minimize intersymbol interference to provide a gain-controlled second signal; and a third adder for adding the first signal and the gain-controlled second signals to each other to provide a signal in which crosstalk and intersymbol interference are corrected.

11. A method of reducing intersymbol interference in the recording/reproducing apparatus of an optical disk having a tangential direction, the method comprising:

dividing an optical signal reflected from the optical disk into central and peripheral parts in the tangential direction of an optical disk to provide central tangential and peripheral tangential detection signals;

controlling the gain value of the peripheral tangential detection signal to produce a gain-controlled peripheral detection system; and operating the gain-controlled peripheral tangential detection signal and the central tangential detection signal to provide a signal in which intersymbol interference signal is corrected;

wherein the gain value is adjusted to minimize intersymbol interference by adjacent marks.

12. The method of claim 11, wherein the gain controlling step comprises multiplying the peripheral tangential detection signal by a gain value adjusted to minimize interference between adjacent marks to provide the gain-controlled peripheral detection signal; and the operating step comprises adding the gain-controlled peripheral detection signal and the central tangential detection signal.

13. A method of reducing crosstalk and intersymbol interference in the recording/reproducing apparatus of an optical disk having a tangential and radial direction, the method comprising:

(a) dividing an optical signal reflected from the optical disk into central and peripheral parts in the radial direction of the optical disk to provide a central radial detection signal and a peripheral radial detection signal, into a first region common to the peripheral parts in the radial direction and peripheral parts in the tangential direction to provide a peripheral radial peripheral tangential detection signal, and into a second region common to the central parts in the radial direction and peripheral parts in the tangential direction to provide a central radial peripheral tangential detection signal;

(b) generating a first signal by (1) controlling the peripheral radial detection signal using a first gain value to provide a gain-controlled peripheral radial detection signal, and (2) operating the gain-controlled peripheral radial detection signal and the central radial detection signal, (c) generating a second signal by (1) controlling the peripheral radial peripheral tangential detection signal using the first gain value to provide a gain-controlled peripheral radial peripheral tangential detection signal, (2) operating the gain-controlled peripheral radial peripheral tangential detection signal and the central radial peripheral tangential detection signal to provide a second signal (3) controlling the second signal using a second gain value to provide a gain-controlled second signal; and (d) operating the first and the gain-controlled second signals to provide a signal in which crosstalk and intersymbol interference are corrected;

wherein the first gain value is adjusted to minimize crosstalk caused by neighboring tracks, and the second gain value is adjusted to minimize intersymbol interference by adjacent marks.

14. The method of claim 13, wherein the controlling step (b)(1) comprises multiplying the peripheral radial detection signal by the first gain value adjusted to minimize crosstalk to provide the gain-controlled peripheral radial detection signal;

the operating step (b)(2) comprises adding the gain-controlled peripheral radial detection signal and the central radial detection signal to provide a first signal;

the controlling step (c)(1) comprises multiplying the peripheral tangential peripheral tangential detection signal by the first gain value to provide the gain-controlled peripheral radial peripheral tangential detection signal;

the operating step (c)(2) comprises adding the gain-controlled peripheral radial peripheral tangential detection signal and the central radial peripheral tangential detection signal to provide the second signal;

the controlling step (c)(3) comprises multiplying the second signal by the second gain value adjusted to minimize intersymbol interference to provide the gain-controlled second signal; and the operating step (d) comprises adding the first and the gain controlled second signal to each other.

15. A device for reducing an intersymbol interference in the recording/reproducing apparatus of a reading surface, the device comprising:

a detector which receives a first signal reflected off the reading surface and which divides the first signal into multiple signals; and a correcting unit which receives the multiple signals and generates a corrected signal in which intersymbol interference is reduced.

16. The device as in claim 15, wherein the multiple signals comprise a center signal associated with a part of the first signal detected by a central part of the detector.

17. The device as in claim 16, wherein the multiple signals further comprise at least one peripheral signal associated with the part of the first signal detected by a peripheral part of the detector and which is adjacent to the central part of the detector.

18. The device as in claim 17, wherein:

the detector produces detector signals corresponding to the multiple signals; and the correcting unit controls a gain value of the detector signal associated with each of the at least one peripheral signal to produce a gain controlled detector signal for each peripheral signal, and combines each gain controlled detector signal with the detector signal associated with the center signal to provide the corrected signal.

19. The device as in claim 18, wherein the at least one peripheral signal is in a lead-lag relationship with the center signal, and the correcting unit uses the lead-lag relationship in controlling the gain value of the peripheral signals.

20. The device as in claim 19, wherein the detector is an optical detector, the first signal is an optical signal, and the multiple signals are optical signals.

21. A device for reducing an intersymbol interference and crosstalk in the recording/reproducing apparatus of a reading surface, the device comprising:

a detector which receives a first signal reflected off the reading surface and which divides the first signal into multiple signals; and a correcting unit which receives the multiple signals and generates a corrected signal in which crosstalk and intersymbol interference are reduced.

22. The device as in claim 21, wherein the multiple signals comprise a center signal associated with a part of the first signal detected by a central part of the detector, and a plurality of a peripheral signals, each associated with the part of the first signal detected by a peripheral part of the detector which is adjacent to the central part of the detector.

23. The device as in claim 22, wherein the multiple signals are organized in at least two signal sets, a first signal set having the center signal a first plurality of a peripheral signals, and a second signal set having a second plurality of peripheral signals.

24. The device as in claim 23, wherein
the detector produces detector signals corresponding to the multiple signals; and
the correcting unit
controls a gain value of the detector signals from the first signal set which are associated with the first plurality of periphery signals to produce a first periphery signal set,
combines the detector signal associated with the center signal and the first periphery set to produce a first intermediate signal,
controls a gain value of the detector signals from the second set which are associated with a first subset of the second plurality of periphery signals to produce a second periphery signal set,
combines the detector signals associated with a second subset of the plurality of periphery signals and the second periphery signal set to produce a second intermediate signal,
controls a gain value of the second intermediate signal to produce a third signal, and
combines the first intermediate signal and the third signal to produce the corrected signal.

25. The device as in claim 24, wherein the resulting combined gain value of the first periphery signal set and the second periphery signal set is adjusted to minimize crosstalk, and the resulting gain value of the third signal is adjusted to minimize intersymbol interference.

26. The device as in claim 25, the second plurality of peripheral signals associated with the second signal set are in a lead-lag relationship in controlling the gain value of the peripheral signals.

27. The device as in claim 26, wherein the detector is an optical detector, the first signal is an optical signal, and the multiple signals are optical signals.

28. A method of reducing an intersymbol interference in the recording/reproducing apparatus of a reading surface, the method comprising:
dividing a first signal reflected off the reading surface into multiple signals;
receiving the multiple signals in a controlling unit; and
generating a corrected signal in which intersymbol interference is reduced.

29. The method of claim 28, wherein the step of dividing comprises dividing the first signal into a center signal associated with the center of a detector and the at least one peripheral signal associated with the parts of the detector adjacent to the center of the detector.

30. The method of claim 29, wherein the step of receiving comprises detecting the center signal and the at least one peripheral signal and generating a plurality of detection signals.

31. The method of claim 30, wherein the step of generating comprises:
gain-controlling the detection signal associated with the at least one peripheral signal to produce a gain-controlled signal for each peripheral signal; and
combining a detection signal associated with the center signal and the gain-controlled signal for each peripheral signal to produce the corrected signal.

32. A method of reducing an intersymbol interference and crosstalk in the recording/reproducing apparatus of a reading surface, the method comprising:
dividing a first signal reflected off the reading surface into multiple signals;
receiving the multiple signals in a controlling unit; and
generating a corrected signal in which intersymbol interference and crosstalk are reduced.

33. The method of claim 32, wherein the step of dividing comprises:
dividing the first signal into a center signal associated with a center of a detector and a plurality of peripheral signals associated with parts of the detector adjacent to the center of the detector; and
organizing the center signal and the peripheral signals in at least two signal sets, a first signal set having the center signal and a first plurality of the peripheral signals, and a second signal set having a second plurality of peripheral signals.

34. The method of claim 33, wherein the step of receiving comprises:
generating a first detection signal set from the first signal set; and
generating a second detection signal set from the second signal set.

35. The method of claim 34, wherein the step of generating the corrected signal comprises:
gain controlling the detector signals from the first detection signal set which are associated with the first plurality of periphery signals to produce a first periphery signal set;
combining the detector signal associated with the center signal and the first periphery set to produce a first intermediate signal;
gain controlling the detector signals from the second detection signal set which are associated with a first subset of second plurality of periphery signals to produce a second periphery signal set;
combining the detector signals associated with a second subset of second plurality of periphery signals and the second periphery signal set to produce a third signal;
gain controlling the third signal to produce a fourth signal; and
combining the first intermediate signal and the fourth signal to produce the corrected signal.

* * * * *